(12) United States Patent
Phillips

(10) Patent No.: US 10,438,307 B2
(45) Date of Patent: Oct. 8, 2019

(54) SYSTEM AND METHOD FOR DISTRIBUTING IMPERATIVE SERVICES AND PRODUCTS

(71) Applicant: Brett P Phillips, Chicago Ridge, IL (US)

(72) Inventor: Brett P Phillips, Oaklawn, IL (US)

(*) Notice: Subject to any disclaimer, the term of this patent is extended or adjusted under 35 U.S.C. 154(b) by 138 days.

(21) Appl. No.: 15/817,191

(22) Filed: Nov. 20, 2017

(65) Prior Publication Data

US 2018/0108098 A1    Apr. 19, 2018

(51) Int. Cl.
*G06Q 50/16* (2012.01)
*G06Q 50/18* (2012.01)
*G06Q 30/06* (2012.01)

(52) U.S. Cl.
CPC ......... *G06Q 50/16* (2013.01); *G06Q 30/0633* (2013.01); *G06Q 50/184* (2013.01)

(58) Field of Classification Search
None
See application file for complete search history.

(56) References Cited

U.S. PATENT DOCUMENTS

2005/0144028 A1* 6/2005 Donahue ............... G06Q 50/16
                                                            705/314
2006/0161654 A1* 7/2006 Hollingsworth, Jr. .................
                                                            G06Q 50/16
                                                            709/224

FOREIGN PATENT DOCUMENTS

WO    WO-2014134673 A1 *  9/2014  ............ G06Q 30/02

* cited by examiner

*Primary Examiner* — Daniel Swerdlow

(57) ABSTRACT

An imperative service system includes at least one server computer that is adapted to communicate with resident electronic devices and property owner systems over Internet. The imperative service system receives an imperative service licensing request with input data entered via an imperative service licensing web page, and generates an individualized property web address for a property or a set of properties. The individualized property web address indicates a protocol, a property location and a domain. The imperative service system sends the individualized property web address to the requesting computer, determines a list of imperative services for the property, receives a request for an imperative service distribution web page including web page links to the list of imperative services over Internet, generates the imperative service distribution web page, and sends the imperative service distribution web page to the requesting computer. The imperative service system can be a cloud sever system.

9 Claims, 5 Drawing Sheets

102 - imperative service system
103 - imperative service distribution web page
104, 106, 108 - imperative service links to users of the imperative service system 102
112, 114, 116 and 118 - imperative service providers systems
113, 115, 117 and 119 - imperative service providers' web pages
120 - real estate property owner system
122 - property owner web page
123 – link to the property owner's imperative service distribution web page 103
130 – tenant
131 – property owner
132 – electronic device

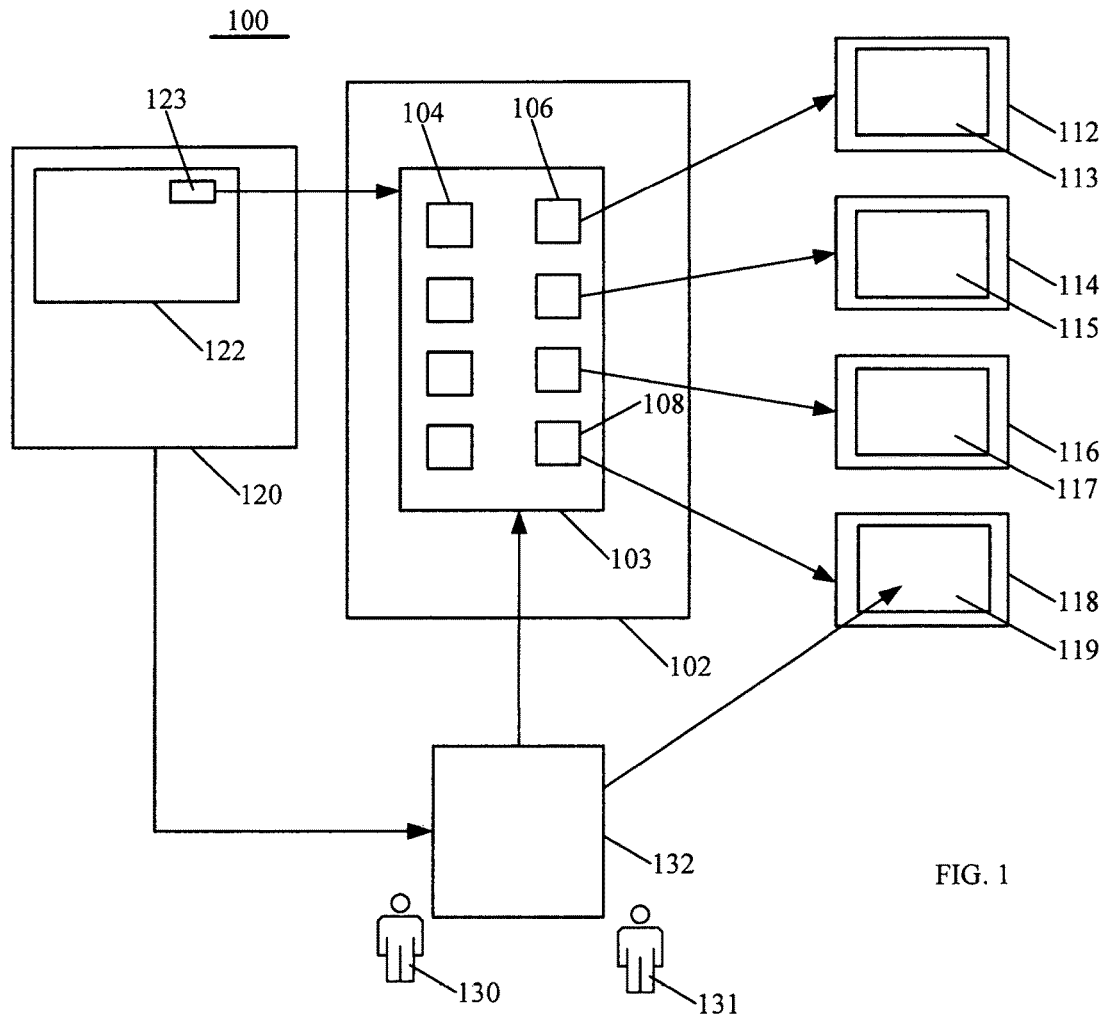

102 - imperative service system
103 - imperative service distribution web page
104, 106, 108 - imperative service links to users of the imperative service system 102
112, 114, 116 and 118 - imperative service providers systems
113, 115, 117 and 119 – imperative service providers' web pages
120 - real estate property owner system
122 – property owner web page
123 – link to the property owner's imperative service distribution web page 103
130 – tenant
131 – property owner
132 – electronic device

Website
_____ 302

Number of properties
_____ 304

Number of occupants
_____ 306

Address of property(s)
_____ 308

Contact phone number
_____ 310

E-mail address
_____ 312

Intended goal
_____ 314

License Now 316

FIG. 3

SYSTEM AND METHOD FOR DISTRIBUTING IMPERATIVE SERVICES AND PRODUCTS

CROSS REFERENCE TO RELATED APPLICATIONS

None.

FIELD OF THE DISCLOSURE

The present invention generally relates to a system and method for improving the distribution process of imperative services and products, and more particularly relates to a system and method for improving the distribution process of imperative services and products to real estate property residents. More particularly still, the present disclosure relates to a system and method for improving the distribution process of imperative services and products to tenants, property owners and governmental departments of properties via the Internet.

DESCRIPTION OF BACKGROUND

Each resident (such as a tenant, owner or governmental department) of a commercial or residential property requires certain imperative services and products. When the term "resident" is used herein it applies to tenants, renters, property owners and other terms that would define occupying or operating a real estate property. When the term "real estate" is used herein it is an all inclusive term for commercial, residential, governmental, municipal and any other types of occupied land or buildings. The imperative services and products include, without limitations to, electricity, renewable electricity, natural gas, security, energy automation, merchant services, payment processing, telephone systems for business operations or residents, television, cellular phone network services, and high speed Internet. Residents (such as property owners and tenants) of a property traditionally acquire the imperative services and products individually, without quantitatively leveraging their buying power together. Furthermore, residents invest their own time to research, qualify, engage and negotiate to acquire imperative services and products. For example, when a tenant moves into a commercial building or a residential building, and when a property owner searches for operational and common area imperative services, the tenant and the property owner usually conducts a research to determine the available imperative service and product providers, and then directly contacts the imperative service providers one by one to acquire the services and products. Moreover, during the search, the property owner is not a participant or an advocate for the treasured tenant; and the tenant operates on her/his own. In addition, the tenant usually fails to obtain the optimal deals and value without leveraged quantitative buying power. Furthermore, the property owner fails to benefit from the services that imperative service and product providers provide for the tenants, and the tenants fail to benefit from the property owners' procurement of imperative service and products.

Accordingly, there is a need for an improved system and method for distributing imperative services and products to residents (such as tenants and real estate property owners) of real estate properties. This novel utility invention, system and process for distributing imperative products and services to residents allow property owners to increase their revenue without increasing rental rates and fees for common area maintenance or rent related fees charged to the tenants. Moreover, the new system and method allows both tenants and property owners to achieve a reduce rate of imperative services and products, save time, and add value on multiple counts. In addition, the new system and method allows property owners, tenants and governmental departments to sustain and increase business by accomplishing the highest net-profit and economic output per square foot.

OBJECTS OF THE DISCLOSED SYSTEM, METHOD, AND APPARATUS

Accordingly, it is an object of this disclosure to provide an imperative service system that distributes imperative services and products to residents (such as tenants and property owners) of real estate properties by creating an individualized property web addresses for each property or each set of properties.

Another object of this disclosure is to provide an imperative service system that distributes imperative services and products to residents (such as tenants and property owners) of real estate properties by providing imperative service distribution web pages pointed to by an individualized property web addresses.

Another object of this disclosure is to provide an imperative service system that distributes imperative services and products to residents (such as tenants and property owners) of real estate properties by providing imperative service distribution web pages that present imperative service and product providers to the residents and property owners.

Another object of this disclosure is to provide an imperative service system that distributes imperative services and products to residents (such as tenants and property owners) of real estate properties using an individualized property web addresses to increase property owners' net-profit per square foot without increasing their per square foot rental fees.

Another object of this disclosure is to provide an imperative service system that distributes imperative services and products to residents (such as tenants and property owners) of real estate properties using an individualized property web addresses to increase tenants' net-profit per square foot.

Another object of this disclosure is to provide an imperative service system that distributes imperative services and products to governmental departments of real estate properties using an individualized property web addresses to increase governmental department budgets' net-profit per square foot.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides an imperative service system for distributing imperative services to residents of a real estate property. The imperative service system includes a server computer having a processing unit, a network interface coupled to the processing unit and adaptively coupled to Internet, a memory operatively coupled to the processing unit, and an imperative service distribution software program operating on the processing unit. The server computer is adapted to communicate with a resident (such as tenants, property owners, and governmental departments) electronic device and a property owner system over Internet. The imperative service distribution software program is adapted to receive a request for an imperative service licensing web page from a property owner electronic device over the network interface, and send the imperative service licensing web page to the property owner electronic device over the network interface. The imperative service distribution software program is also adapted to receive an imperative service licensing request from the property owner electronic device over the network interface. The imperative service licensing request includes input data entered via the imperative service licensing web page. The imperative service distribution software program is further adapted to validate the imperative service licensing request, and generate an individualized property web address for a property of the property owner. The individualized property web address includes a protocol part, a property identifier part individually identifying the property, and a domain part. Moreover, the imperative service distribution software program is adapted to send the individualized property web address to the property owner electronic device over the network interface via E-mail, determine a list of imperative services applicable to the property, and receive a request for an imperative service distribution web page including web page links to the list of imperative services from a requesting computer over the network interface. In addition, the imperative service distribution software program is adapted to, in response to the request for the imperative service distribution web page, generate the imperative service distribution web page, and send the imperative service distribution web page to the requesting computer over Internet.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a simplified block diagram of a system for distributing imperative services and products to real estate property residents in accordance with this disclosure.

FIG. 3 is an illustrative Internet web page for a real estate property owner to register for an imperative service and product distribution system in accordance with this disclosure.

Figure 2:
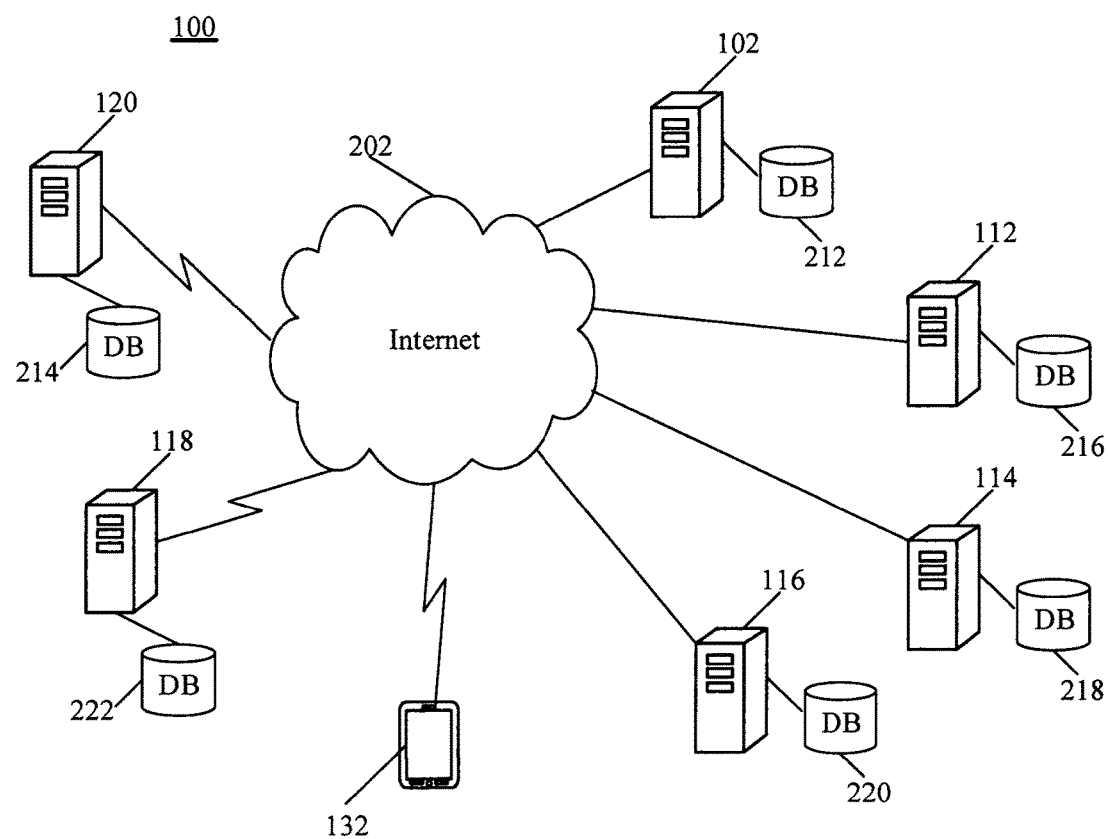
FIG. 2 is a simplified block diagram of a system for distributing imperative services and products to real estate property residents in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Turning to the Figures and to FIG. 1 in particular, a simplified block diagram of a system for distributing imperative services and products to real estate property residents (such as tenants, property owners and governmental departments) is shown and generally indicated at 100. The imperative service and product distribution system 100 includes an imperative service system 102, imperative service provider systems 112, 114, 116 and 118, a real estate property owner system 120, and an electronic device used by a resident to access the imperative service system 102. The imperative service system 102 provides an individualized World Wide Web ("WWW") address for each property or a set of properties. The set of properties can be, for example, all properties of an owner or a collection of real estate properties of the owner at a particular location. As used herein, it is said the imperative service system 102 providers an individualized WWW address for each property. For a particular property, it's individualized WWW address points to a WWW page 103 (also referred to herein as an imperative service distribution web page) that presents imperative service links, such as the links 104, 106 and 108 to users of the system 100. For example, a tenant 130, or a property owner 131 operates the electronic device 132, such as a smart phone, a tablet computer, a laptop computer, or a desktop computer, to point a web browser to the web page of a property that the tenant 130 is residing in or the property owner 131 owns.

In one implementation, the individualized WWW address (also referred to herein as a property web address) includes a protocol part (such as http://), a property identifier part, and a domain part (such as thedicloud.com). For example, for a commercial real estate property, residential real estate property and/or any other type of building at the location of 2040 LaSalle Street, Chicago, Ill. 60606, the individualized property web address can be http://342mainstreet.dicloud.com. In this illustrative property web address, the property identifier part "343mainstreet" individually identifies the property at 2040 LaSalle Street, Chicago, Ill. 60606. The individual property web address can be Uniform Resource Locator ("URL") address, a Uniform Resource Identifier ("URI") address, or other type of Internet address. The individual property web address may not include the protocol part without deviating from the present teachings.

The imperative service distribution web page 103 hosted on the imperative service system 102 includes links to web pages of imperative service and product provider systems, such as the provider systems 112, 114, 116, and 118. The user 130 (or 131) of the electronic device 132 accesses the imperative service distribution web page 103 to select and engage an imperative service or product provider by, for example, clicking the provider's link, such as the link 106 or 108. The electronic device 132 is then redirected to the provider's web page hosted on the provider's system, such as the imperative service provider system 116. Four illustrative imperative service providers' web pages are indicated at 113, 115, 117 and 119 respectively. The redirection Uniform Resource Locator ("URL") leading to a provider web page, such as the web page 119, includes an identifier that indicates the provider of the imperative service system 102 to the imperative service provider system 118. For example, in the redirection URL, the following parameter Source ID is included to individually identify the provider of the imperative service system 102 to the imperative service provider system 118:

SourceID=12345678

When an imperative service or product provider link, such as the link 108, is clicked, the user is redirected to the web page 119, which is generated by the imperative service provider system 118 and displayed on the electronic device 132. Using the web page 119, the user purchases a desired service or product, such as electricity, renewable electricity, natural gas, security, energy automation, merchant services, payment processing, telephone systems for business operations or residents, television, cellular phone network services, and high speed Internet, etc. In such a case, the imperative service provider understands that this transaction is generated via the imperative service system 102. Accordingly, the imperative service provider provides a financial benefit, such as a percentage or portion of the service fee transaction, to the provider of the imperative service system 102. As an example of how the tenant 130 and property owner 131 uses the imperative service system 102, the electronic device 132 first loads and displays the web page 103. When a link (such as the link 108) is clicked, the web page 119 is then loaded and displayed on the electronic device 132.

The imperative service system 102 then allocates portions of the financial benefit to the owner of the property and the provider of the imperative service system 102. The imperative service system 102 thus reduces the resident's 130 living cost, lowers operational expenses for the property owner 131 and increases the property owner's 131 revenue without increasing rental fees against the tenant 130. Furthermore, with a rich set of multiple service providers gathered and listed on the web page 103, the imperative service system 102 significantly improves the imperative service acquisition process by which the resident 130 and the property owner 131 engage imperative services and products. In addition, the imperative service system 102 presents the imperative service and product providers 112-118 to the tenant 130 at a lower service rate, and thus reduces the tenant's 130 living cost.

The property owner system 120 may also host a web site hosting a web page 122 that provides information to its tenants. The property owner web page 122 may include a link pointing to the imperative service distribution web page 103. In other words, the link address is the property owner's individualized property web address incorporated into the property owner's Internet system 120. When a resident or a prospect tenant of the property visits the web page 122 and clicks the link 123, the imperative service distribution web page 103 is then retrieved from the imperative service system 102 and displayed on a screen of the of the user's computer.

The imperative service and product distribution system 100 is further illustrated by reference to FIG. 2. Referring to FIG. 2, a simplified block diagram of the system 100 for distributing imperative services and products to real estate property residents (such as tenants and property owners) is shown. The systems 120, 102, 112, 114, 116 and 118 are operatively coupled to the Internet 202. The systems 120, 102, 112, 114, 116 and 118 are operatively coupled to database systems 214, 212, 216, 218, 220, and 222 respectively to storing and retrieving data. The database systems 214, 212, 216, 218, 220, and 222 can be, for example, relational databases as standalone databases, database farms, or cloud based databases. The systems 120, 102, 112, 114, 116 and 118 can be implemented using one or more server computers, server farms or cloud servers accessible over the Internet 202. Each server computer includes a processing unit (such as a CPU), a network interface operatively coupled to the processing unit and the Internet 202, some amount memory operatively coupled to the processing unit, and an operating system running on the processing unit.

Referring now to FIG. 3, for a property owner to register for the services provided by the imperative service system 102, the owner can operate an electronic device (such as a smart phone, a tablet computer, a laptop computer, or a desktop computer) to access a licensing web page provided by the system 102. An illustrative licensing web page is further illustrated by reference to FIG. 3. Referring to FIG. 3, an illustrative licensing web page for property owner to license services provided by the imperative service system 102 is shown and generally indicated at 300. The illustrative licensing web page 300 includes a website input field 302, a number of properties input field 304, a number of occupants input field 306, an address of property input field 308, a contact phone number input field 310, an E-mail address input field 312, and an intended goal input field 314. Once the owner enters all the required input data, she/he then presses the License Now button 316 to request the imperative service system 102 to register for the services it provides. It should be noted that the licensing web page 300 may include other input fields necessary for using the imperative service system 102.

Figure 4:
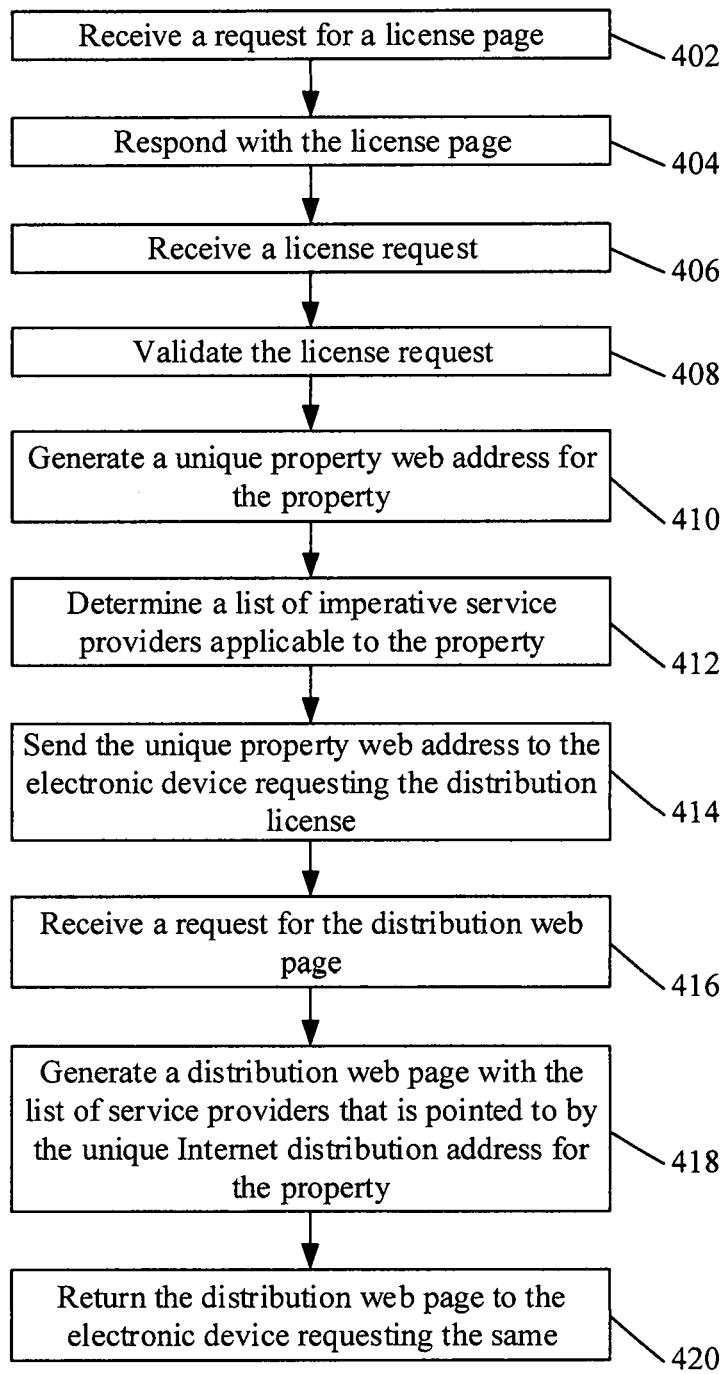
FIG. 4 is a flowchart depicting a process by which an imperative service and product distribution system provides an individualized World Wide Web addresses to different properties or sets of properties in accordance with this disclosure.

Referring now to FIG. 4, a flowchart depicting a process by which the imperative service system 102 distributes imperative services is shown and generally indicated at 400. At 402, an imperative service distribution software program running on a server computer of the imperative service system 102 receives a request from, for example, an electronic device operated by a property owner for an imperative service licensing web page. At 404, the imperative service distribution software program returns the registration web page (such as the licensing web page 300) to the property system 120. In response, the property owner's system 120 displays the licensing web page. After the owner enters the input data and clicks the button 316, the owner electronic device sends the licensing request containing input data to the imperative service system 102. At 406, the imperative service distribution software program receives the licensing request with the input data entered via the web page 300. At 408, the imperative service distribution software program validates the licensing request.

When the validation is successful, at 410, the imperative service distribution software program generates the individualized property web address for the property. At 412, the imperative service distribution software program determines a list of imperative service providers available for residents of the property. At 414, the imperative service distribution software program sends the individualized property web address to the property owner's electronic device. The individual property web address can be sent via an E-mail message or displayed on a web page. Alternatively, at 414, the imperative service distribution software program sends the individualized property web address to the owner electronic device without the protocol part when the protocol part is known to both ends. In another alternative, at 414, the imperative service distribution software program sends the individualized property web address to the owner electronic device without the domain part when the domain part is known to both ends. In both alternate scenarios, as used herein, it is also said that the imperative service distribution software program sends the individual property web address to the owner electronic device 120 or 132.

Once the owner electronic device receives the individual property web address, the owner can create the link 123 of the individual property web address in the web page 122. Moreover, the owner can use the owner electronic device to send or post on her/his website the individualized property web address to tenants and/or prospect tenants (such as the user 130) of the owner's property. In addition, to sending or posting the property owner's individualized property web address to her/his potential and existing tenants, the property owner purchases her/his operational imperative service from licensed imperative service distribution web page 103.

When a user clicks the link of the individualized property web address on the web page 132 or the electronic device 132, a request for the imperative service distribution web page 103 is sent to the imperative service system 102. At 416, the imperative service distribution software program receives the request from a computer, such as the electronic device 132 or a different computer operated by a resident. In response to the request, at 418, the imperative service distribution software program generates the imperative service distribution web page 103. At 420, the imperative service distribution software program sends the imperative service distribution web page 103 to the requesting computer, which then displays it on its screen.

The imperative service system 102 distributes various imperative service and products to residents (such as tenants and property owners) and improves the imperative service engagement process. The imperative service and product providers thus provides a financial benefit to the provider of the imperative service system 102. The benefit can be a financial payment. The imperative service system 102 then distributes the benefit between the property owner and the provider of the imperative service system 102. The benefit allocation process is further illustrated by reference to FIG. 5.

Figure 5:
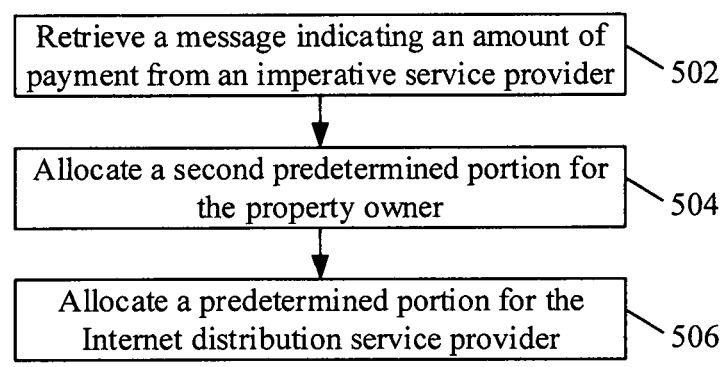
FIG. 5 is a flowchart depicting a process by which an imperative service and product distribution system distributes benefits of using an imperative service system to different parties in accordance with this disclosure.

Referring to FIG. 5, a flowchart depicting a process by which the imperative service system 102 allocates the benefit is shown and generally indicated at 500. At 502, the imperative service distribution software program receives a message indicating an amount of payment from an imperative service provider. At 504, the imperative service distribution software program allocates a first predetermined portion (such as 70%) of the benefit for the property owner of the tenant. At 506, the imperative service distribution software program allocates a third predetermined portion (such as 30%) of the benefit for the provider of the imperative service system 102.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. An imperative service system for distributing imperative services to residents of a real estate property, the imperative service system comprising:
   i) a server computer having a processing unit, a network interface coupled to said processing unit and adaptively coupled to Internet, a memory operatively coupled to said processing unit, and an imperative service distribution software program operating on said processing unit, wherein said server computer is adapted to communicate with a resident electronic device, a property owner electronic device and a property owner system over Internet; and
   ii) said imperative service distribution software program adapted to:
      1) receive a request for an imperative service licensing web page from a property owner electronic device over said network interface;
      2) send said imperative service licensing web page to said property owner electronic device over said network interface;
      3) receive an imperative service licensing request from said property owner electronic device over said network interface, wherein said imperative service licensing request includes input data entered via said imperative service licensing web page;
      4) validate said imperative service licensing request:
      5) generate an individualized property web address for a property of said property owner, wherein said individualized property web address includes a property identifier part individualizing identifying said property;
      6) send said individualized property web address to said property owner electronic device over said network interface via E-mail;
      7) determine a list of imperative services applicable to said property;
      8) receive a request for an imperative service distribution web page including web page links to said list of imperative services from a requesting computer over said network interface, wherein each of said web page links to said list of imperative services includes a source identifier indicating said imperative service system;
      9) in response to said request for said imperative service distribution web page, generate said imperative service distribution web page indicating said list of imperative services; and
      10) send said imperative service distribution web page to said requesting computer over Internet.

2. An imperative service system for distributing imperative services to residents of a real estate property, the imperative service system comprising:
  i) a server computer having a processing unit, a network interface coupled to said processing unit and adaptively coupled to Internet, a memory operatively coupled to said processing unit, and an imperative service distribution software program operating on said processing unit, wherein said server computer is adapted to communicate with a resident electronic device, a property owner electronic device and a property owner system over Internet; and
  ii) said imperative service distribution software program adapted to:
    1) generate an individualized property web address for a property;
    2) send said individualized property web address to a property owner electronic device over said network interface;
    3) determine a list of imperative services applicable to said property;
    4) receive a request for an imperative service distribution web page including web page links to said list of imperative services from a requesting computer over said network interface, wherein each of said web page links to said list of imperative services includes a source identifier indicating said imperative service system;
    5) in response to said request for said imperative service distribution web page, generate said imperative service distribution web page; and
    6) send said imperative service distribution web page to said requesting computer over Internet.

3. The imperative service system of claim 2, wherein said individualized property web address includes a property identifier part individually identifying said property.

4. The imperative service system of claim 3, wherein said individualized property web address further includes a domain part.

5. The imperative service system of claim 4, wherein said individualized property web address further includes a protocol part.

6. The imperative service system of claim 2, wherein each of said web page links to said list of imperative services includes a source identifier indicating said imperative service system.

7. The imperative service system of claim 2, wherein said imperative service distribution software program sends said individualized property web address to said property owner electronic device by an E-mail message or by displaying said individualized property web address on a web page.

8. The imperative service system of claim 2, wherein said imperative service distribution software program is further adapted to:
  1) receive a request for an imperative service licensing web page from said property owner electronic device over said network interface;
  2) send said imperative service licensing web page to said property owner electronic device over said network interface;
  3) receive an imperative service licensing request from said property owner electronic device over said network interface, wherein said imperative service licensing request includes input data entered via said imperative service licensing web page; and
  4) validate said imperative service licensing request before generating said individualized property web address for said property.

9. The imperative service system of claim 2, wherein said imperative service system is a cloud based system.

* * * * *